US012738019B2

(12) United States Patent
Lee et al.

(10) Patent No.: US 12,738,019 B2
(45) Date of Patent: Sep. 15, 2026

(54) IMAGE MATCHING USING CHROMA-ENHANCED OR ADAPTABLE SIZE FEATURES

(71) Applicant: QUALCOMM Incorporated, San Diego, CA (US)

(72) Inventors: Soonam Lee, San Diego, CA (US); Khalid Tahboub, San Diego, CA (US); Bing Han, San Diego, CA (US); Kai Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 18/665,325

(22) Filed: May 15, 2024

(65) Prior Publication Data

US 2025/0356616 A1 Nov. 20, 2025

(51) Int. Cl.

| | |
|---|---|
| ***G06V 10/75*** | (2022.01) |
| ***G06V 10/20*** | (2022.01) |
| ***G06V 10/50*** | (2022.01) |
| ***G06V 10/56*** | (2022.01) |
| ***G06V 10/74*** | (2022.01) |

(52) U.S. Cl.
CPC ............ *G06V 10/751* (2022.01); *G06V 10/20* (2022.01); *G06V 10/507* (2022.01); *G06V 10/56* (2022.01); *G06V 10/761* (2022.01)

(58) Field of Classification Search
CPC .... G06V 10/751; G06V 10/56; G06V 10/761; G06V 10/20; G06V 10/507
See application file for complete search history.

(56) References Cited

U.S. PATENT DOCUMENTS

2009/0067724 A1* 3/2009 Hirohata .............. G03G 21/046 382/190
2015/0178932 A1* 6/2015 Wyatt .................. H04N 19/436 707/748
2016/0307334 A1* 10/2016 Dos Santos Mendonca ............... G06T 7/97
2020/0084320 A1* 3/2020 Xiao .................... H04N 1/4092
2021/0374908 A1* 12/2021 Lin ........................ G06T 3/4053
2022/0036570 A1* 2/2022 Aizaki ............... H04N 1/00774
2022/0164596 A1* 5/2022 Chun ....................... G06N 3/08

* cited by examiner

*Primary Examiner* — David Perlman
(74) *Attorney, Agent, or Firm* — Dinsmore & Shohl LLP/QUALCOMM Incorporated

(57) ABSTRACT

Certain aspects of the present disclosure provide techniques for feature-based image matching. A method generally includes obtaining a first image frame and a second image frame; generating a modified first image frame and a modified second image frame, wherein to generate the modified first image frame and the modified second image frame comprises to convert a first color space of the first image frame and a second color space of the second image frame to a third color space; extracting a first plurality of features from the modified first image frame; extracting a second plurality of features from the modified second image frame; and determining at least one first matching cost based on the first plurality of features and the second plurality of features.

20 Claims, 7 Drawing Sheets

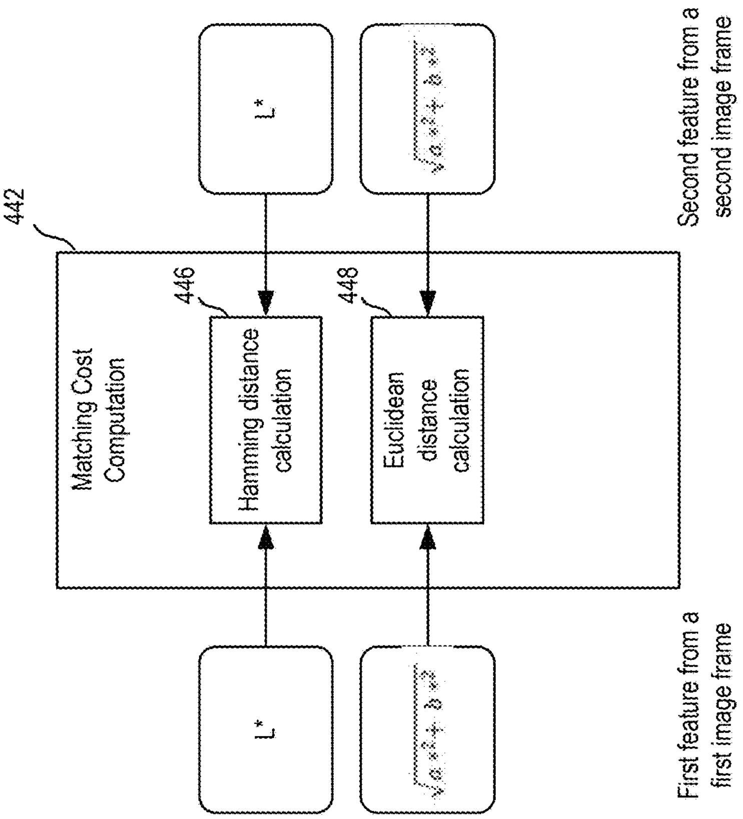

FIG. 4D

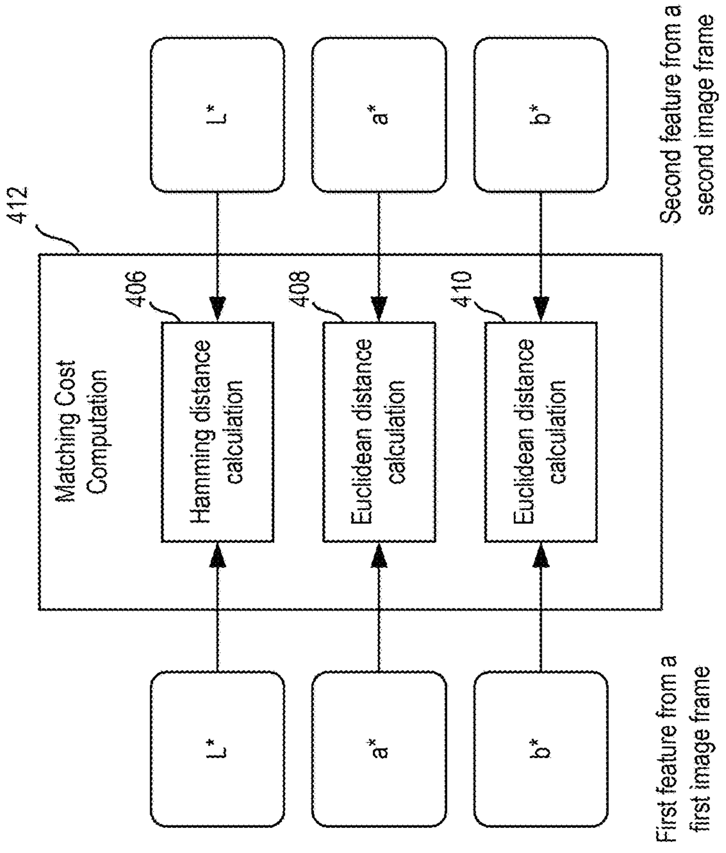

Matching Cost Computation

406 Hamming distance calculation

408 Euclidean distance calculation

410 Euclidean distance calculation

L* a* b*

First feature from a first image frame

L* a* b*

Second feature from a second image frame

442

Matching Cost Computation

446 Hamming distance calculation

448 Euclidean distance calculation

L*

$\sqrt{a^{*2} + b^{*2}}$

First feature from a first image frame

L*

$\sqrt{a^{*2} + b^{*2}}$

Second feature from a second image frame

IMAGE MATCHING USING CHROMA-ENHANCED OR ADAPTABLE SIZE FEATURES

INTRODUCTION

Field of the Disclosure

Aspects of the present disclosure relate to techniques for image matching.

DESCRIPTION OF RELATED ART

Computer vision is a field of artificial intelligence (AI) that focuses on using computers to process, analyze, and interpret visual data. A key part of computer vision is the ability to recognize patterns and understand relationships between multiple images, which may be accomplished via existing image matching techniques. For example, an objective of image matching (also commonly referred to as "image feature matching," "feature matching," "pixel matching," and/or the like) is to establish precise feature correspondence between different images. The images may capture a similar (or same) scene and/or object at different times, with different lighting and/or scale, from different viewpoints, and/or from different imaging modalities. Establishing correspondences between similar features in different images serves as the foundation for many computer vision tasks, including optical flow estimation, image alignment, image fusion, stereo vision, interest point tracking, visual localization, structure from motion (SfM), and/or simultaneous localization and mapping (SLAM), to name a few.

SUMMARY

One aspect provides a method for image matching. The method includes obtaining a first image frame and a second image frame; generating a modified first image frame and a modified second image frame, wherein to generate the modified first image frame and the modified second image frame comprises to convert a first color space of the first image frame and a second color space of the second image frame to a third color space; extracting a first plurality of features from the modified first image frame; extracting a second plurality of features from the modified second image frame; and determining at least one first matching cost based on the first plurality of features and the second plurality of features.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 4C depicts another example matching cost computation using chroma-enhanced features.

FIG. 4D depicts another example matching cost computation using chroma-enhanced features.

DETAILED DESCRIPTION

Figure 1:
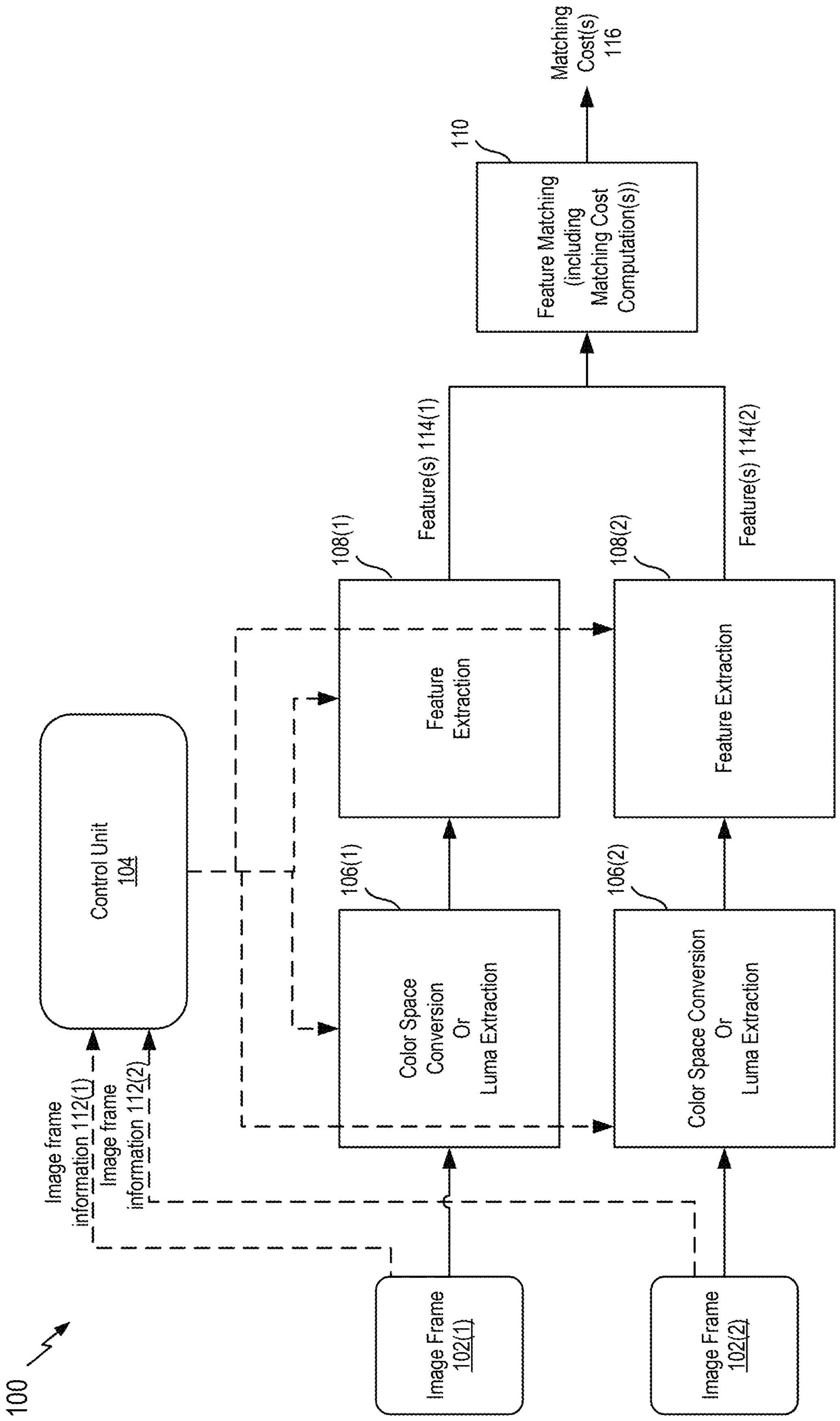
FIG. 1 depicts an example workflow for image matching using chroma-enhanced and/or adaptable size features.

Image matching generally includes three stages: (1) feature detection, (2) feature description, and (3) feature matching. In certain aspects, feature detection and feature description are condensed to a single step referred to as "feature extraction."

Feature detection involves identifying features in at least two images, also referred to herein as "image frames." In certain aspects, dense feature detection is used to extract features from image frames at a dense or fine-grained level. For example, dense feature detection may include dividing the entire pixel area of an image frame into multiple patches of pixel(s), where each patch of pixels is referred to as a "feature." Each feature may have a fixed feature size, or put differently, include a fixed size area of pixel(s) (e.g., a fixed patch size) in the image frame. For example, a first feature associated with a first image frame may include a first 7×9 pixel area (e.g., a 7×9 patch containing 63 pixels of the first image) in the first image, a second feature associated with the first image frame may include a second 7×9 pixel area in the first image, and so on. The fixed feature size may be used across images for image matching. It is noted that dense feature detection is different from sparse feature detection, which may involve identifying features in an image frame based on specific keypoints (e.g., such as points, regions, and/or structures of interest) in the image frame. Though dense feature detection is discussed herein, in certain aspects, sparse feature detection may be used.

Once features are detected, feature description is performed to describe these features in a way that allows for efficient matching and recognition between images. The goal of feature description is to create a representation of each of the features that captures their distinctive characteristics. In certain aspects, feature description includes representing each identified feature as a "feature descriptor." In certain aspects, a feature descriptor may describe the appearance, shape, texture, etc. of a feature, and more specifically, of the area (e.g., patch) associated with the feature.

Feature matching then involves finding correspondences between the features extracted from the different images. In certain aspects, features are corresponded, or matched, based on the similarity of their descriptors. By identifying corresponding features between images, computer vision systems may be able to understand relationships and/or make meaningful connections between images, which are fundamental and critical tasks in various computer vision applications.

While image matching provides the aforementioned technical benefits, such techniques are not without limitations. For example, image matching performance may not be guaranteed in low-light conditions (e.g., occurring in many different applications, such as night-time photography, astronomy, microscopy, etc.). Specifically, images captured in low-light environments often suffer from low resolution (e.g., a low level of detail and small pixel values) and significant noise, due to a low signal-to-noise ratio (SNR), which may disrupt image content. Low resolution and noisy images present technical challenges for image matching because they contain less visual information and more uncertainty. For example, (1) low resolution images may lack fine details and (2) noisy images may contain unwanted variations and/or distortions, making it more difficult to match features from such images. As such, low resolution and noisy images may lead to ambiguity and errors in feature description, which may affect the performance and/or accuracy of subsequent feature matching.

Image matching performance may also be compromised due to the use of a fixed feature size (e.g., fixed patch size) for feature detection and description. For example, image matching using a larger feature size (e.g., a 7×9 feature size) for higher resolution images (e.g., having more pixels per inch, such as a 320×240 pixel image) may be desired. However, image matching using the same larger feature size (e.g., the same 7×9 feature size) for lower resolution images (e.g., having less pixels per inch, such as a 160×120 pixel image) may not be desired. Specifically, performing image matching using the larger feature size may be inefficient for lower resolution images. Further, the memory usage and/or computational burden associated with performing image matching using the larger feature size on lower resolution images may be significant. As such, variable feature sizes, based on image resolution, may be desired when performing image matching to help reduce resource and/or power consumption.

Certain aspects described herein may overcome the aforementioned technical problems with existing image matching techniques and improve upon the state of the art. For example, certain aspects described herein provide techniques for performing image matching using chroma-enhanced features. Specifically, the image matching may include an additional step of image enhancement via color space conversion (also referred to as "color space transform"), as a preprocessing step prior to feature extraction. A color space describes a specific, measurable, and fixed range of possible colors and luminance values. Color space conversion refers to operations in digital image processing used to manipulate the color information of images. Aspects described herein may use color space conversion to convert at least (1) a first image from a first color space to a second color space to generate a modified first image and (2) a second image from a third color space to the second color space to generate a modified second image. The first color space and the third color space may be the same or different color spaces. The first color space, the second color space, and/or the third color space may comprise a CIELAB color space, a red, green, and blue (RGB) color space, a cyan, magenta, yellow, and key (CMYK) color space, and/or the like. Feature extraction may then be performed using the modified first and second images in the second color space. As such, the features (or "chroma-enhanced" features) may be enhanced with second color space information for feature matching.

Notably, the images may be converted for color manipulation and adjustment to correct color balance and/or enhance color contrast in the images prior to feature extraction. As such, the use of color space conversion may have the beneficial technical effect of improving feature detection and feature description tasks, thereby improving the overall accuracy of feature matching between these images. For example, the improved image quality may allow for easier and more accurate extraction of meaningful features, including generating robust descriptors for such features (e.g., based on the additional chroma information), especially for low resolution and/or noisy images.

In certain aspects, the images may be converted to a CIELAB color space (e.g., the "second color space") via color space conversion. The CIELAB color space, also referred to as a "Lab color space" or "L*a*b* color space" is a color space defined by the International Commission on Illumination (e.g., the CIE in CIELAB is the abbreviation for the Commission's French name, Commission Internationale de l'Eclairage). The L*a*b* color space model expresses color as three values: a lightness (L*) channel, a chroma channel a* (e.g., a green-red attribute), and a chroma channel b* (e.g., a blue-yellow attribute). For example, the L*a*b* color space model may include chromatic information as well as texture information for an image. Unlike an RGB color space model and/or a CMYK color space model, the L*a*b* color space model is designed to approximate human perception of color, making it useful for color correction and other color-based operations. For example, a* and b* are four unique colors of a human's visual system (e.g., red, green, blue, and yellow). Further, the L*a*b* color space model may beneficially provide a perceptually uniform space. For example, L* may be perceptually proportional to perceptual lightness, such that L* represents the texture of the images.

In certain aspects, color space conversion is performed for the first image and the second image based on characteristics associated with the two images. In certain aspects, color space conversion is performed based on one or more characteristics associated with the first image and/or the second image satisfying one or more criteria. For example, characteristic(s) associated with each of the first image and the second image may include brightness, an SNR, and/or a color histogram (e.g., indicating an amount of variance in color for each image). Color space conversion may be performed if each of the one or more characteristics satisfy the one or more criteria. For example, if the brightness characteristic of each image satisfies a brightness threshold, if the SNR of each image satisfies an SNR threshold, and if the color histogram of each image satisfies a color histogram threshold (e.g., indicating that the image contains sufficient color variation to perform color space conversion). Color space conversion may not be performed, however, if one or more of the criteria are not met, e.g., any one of the one or more characteristics do not satisfy any one of the one or more criteria. Instead, a luminance ("luma") representation of each image may be extracted prior to feature extraction (referred to herein as "luma extraction"). Luma extraction may include converting an image in a color space to grayscale by eliminating hue and saturation information while retaining luminance. Luma extraction may utilize texture information (e.g., grayscale) without chromatic information (e.g., without color). A luma representation, resulting from such extraction, may represent the brightness of the image in monochrome.

In some other cases, color space conversion may be performed if one or more of the characteristics (e.g., the brightness characteristic of each image, the SNR of each image, and the color histogram of each image) satisfy their respective thresholds (rather than all). In some other cases, the criteria may include one or more of the brightness threshold, the SNR threshold, and the color histogram threshold (e.g., not necessarily all) for determining whether color space conversion is permitted.

In addition to, or alternative to, performing image matching using chroma-enhanced features, in certain aspects, image matching is performed using an adaptable feature size. For example, different feature sizes may be considered for feature extraction based on a first resolution associated with the first image and a second resolution associated with the second image. If the first resolution and the second resolution comprise higher resolutions, then a larger feature size may be selected for feature extraction than in cases where the first resolution and the second resolution comprise lower resolutions. If the first resolution and the second resolution comprise lower resolutions, then a smaller feature size may be selected for feature extraction than in cases where the first resolution and the second resolution comprise higher resolutions. This ability to adapt the feature size based on image resolution helps to realize the benefits outlined above including (1) improved accuracy, (2) reduced resource overhead, and/or (3) reduced power consumption.

Although aspects herein describe performing image matching, and in some cases, color space conversion, for two images, in certain other aspects, image matching may be performed for more than two images and color space conversion may be performed for each of these images, prior to feature extraction.

Aspects Related to Image Matching Using Chroma-Enhanced and/or Adaptable Size Features FIG. 1 depicts an example workflow 100 for image matching using chroma-enhanced and/or adaptable size features. Workflow 100 presents steps for performing image matching between two image frames 102(1), 102(2) to establish correspondences between similar features in image frames 102(1), 102(2). For example, using workflow 100, a matching cost 116 may be computed between each of different feature pair(s), including one feature from image frame 102(1) and one feature from image frame 102(2). A respective matching cost 116 determined for a respective feature pair may quantify the correspondence between features associated with the feature pair. In certain aspects, the matching costs 116 determined for different feature pairs are compared to determine the feature pair(s) with the smallest matching cost(s) 116. The feature pair(s) with the smallest matching cost(s) 116 may represent feature pair(s) in image frames 102(1), 102(2) with the greatest correspondence(s).

In certain aspects, image frames 102(1), 102(2) are optical flow (OF) images. For example, image frames 102(1), 102(2) may be captured from the same viewpoint and/or orientation but with different timestamps (e.g., image frame 102(2) may be captured at a current time (t) and image frame 102(1) may have been captured at time (t−1)). In certain aspects, image frames 102(1), 102(2) are depth from stereo (DFS) images. For example, image frames 102(1), 102(2) may be captured at the same time (e.g., both captured at time (t)) but from different viewpoints and/or orientations (e.g., image frame 102(1) may capture a more left perspective of an object while image frame 102(2) may capture a more right perspective of an object).

As shown in FIG. 1, image matching in workflow 100, to compute matching cost(s) 116, may include feature extraction at blocks 108(1), 108(2) (e.g., including both feature detection and feature description, as described above) and feature matching at block 110. Additionally, as a pre-processing step prior to feature extraction at blocks 108(1), 108(2), color space conversion may, in some cases, occur at blocks 106(1), 106(2). For example, color space conversion may occur at both block 106(1) and block 106(2). If color space conversion is not performed, then luma extraction may be used instead, at both block 106(1) and block 106(2). A control unit 104 may be configured to control when color space conversion is warranted based on characteristic(s) associated with image frame 102(1) and/or image frame 102(2). Further, control unit 104 may be configured to determine a feature size for feature extraction, at blocks 108(1), 108(2), based on a first frame resolution of image frame 102(1) and/or a second frame resolution of image frame 102(2). For example, a same feature size, determined by control unit 104, may be used at both blocks 108(1), 108(2) for performing feature extraction (e.g., features associated with image frame 102(1) may have a same feature size as features associated with image frame 102(2)).

Although FIG. 1 depicts example image matching between only two image frames 102(1), 102(2), in some other examples, workflow 100 may be used to perform image matching between three or more image frames to understand the relationship(s), if any, between these image frames.

Workflow 100 begins with obtaining image frame 102(1) and image frame 102(2). Image frame 102(1) may be a two-dimensional (2D) image of a three-dimensional (3D) space and/or object captured at a first time, $t_1$. Image frame 102(2) may be 2D image of a 3D space and/or object captured at a second time, $t_2$. In some cases, image frame 102(1) and image frame 102(2) may be captured at the same time. In certain aspects, the same 3D space and/or object is captured by image frames 102(1), 102(2). In certain aspects, image frames 102(1), 102(2) are captured using a same image sensor. In certain other aspects, image frames 102(1), 102(2) are captured using different image sensors. An image sensor used to capture image frame 102(1) and/or image frame 102(2) may include, but is not limited to, an optical sensor (e.g., a camera, a laser sensor, etc.), a thermal sensor, an infrared sensor, and/or the like. Image frames 102(1), 102(2) may be captured from the same or different viewpoints and/or with the same or different lighting. Image frames 102(1), 102(2) may have the same or different resolution, scale, tone, and/or contrast. Image frame 102(1)

may be captured in a first color space, and image frame 102(2) may be captured in a second color space. The first color space and the second color space may be the same color space or different color spaces.

Workflow 100 then proceeds with performing color space conversion or luma extraction at blocks 106(1), 106(2). Luma extraction, at blocks 106(1), 106(2), may include extracting a first luma representation (not shown) of image frame 102(1) and a second luma representation (not shown) of image frame 102(2), respectively. The first luma representation may include information about a luma channel associated with image frame 102(1) (e.g., representing a brightness strength of the first luma representation). The second luma representation may include information about a luma channel associated with image frame 102(2) (e.g., representing a brightness strength of the second luma representation).

Alternatively, color space conversion, at block 106(1), may include generating a first modified image frame (not shown) by converting the first color space of image frame 102(1) to a third color space. Similarly, color space conversion, at block 106(2), may include generating a second modified image frame (not shown) by converting the second color space of image frame 102(2) to the third color space.

In certain aspects, the third color space may be an L*a*b* color space. As such, the first modified image frame and the second modified image frame may include information about a lightness (L*) channel, a chroma channel a*, and a chroma channel b* associated with image frame 102(1) and image frame 102(2), respectively. The information about chroma channel a* may indicate information about a green-red attribute of the modified image frame. The information about chroma channel b* may indicate information about a yellow-blue attribute of the modified image frame.

As shown in FIG. 1, performance of the color space conversion or the luma extraction at blocks 106(1), 106(2) may be controlled by control unit 104. For example, control unit 104 may determine whether color space conversion or luma extraction should be performed for image frames 102(1), 102(2). In certain aspects, control unit 104 makes this determination based on characteristic(s) associated with image frame 102(1) and/or characteristics associated with image frame 102(2). Characteristic(s) associated with image frames 102(1), 102(2) may be based on image frame information 112(1) associated with image frame 102(1) and image frame information 112(2) associated with image frame 102(2), respectively. Image frame information 112(1) may include information about image frame 102(1) quality and/or attributes, an image sensor used to capture image frame 102(1), a noise estimation for image frame 102(1), and/or a color histogram associated with image frame 102 (1). Image frame information 112(2) may include similar information but for image frame 102(2). Control unit 104 may use image frame information 112(1), 112(2) to determine characteristic(s) associated with image frames 102(1), 102(2).

Figure 2:
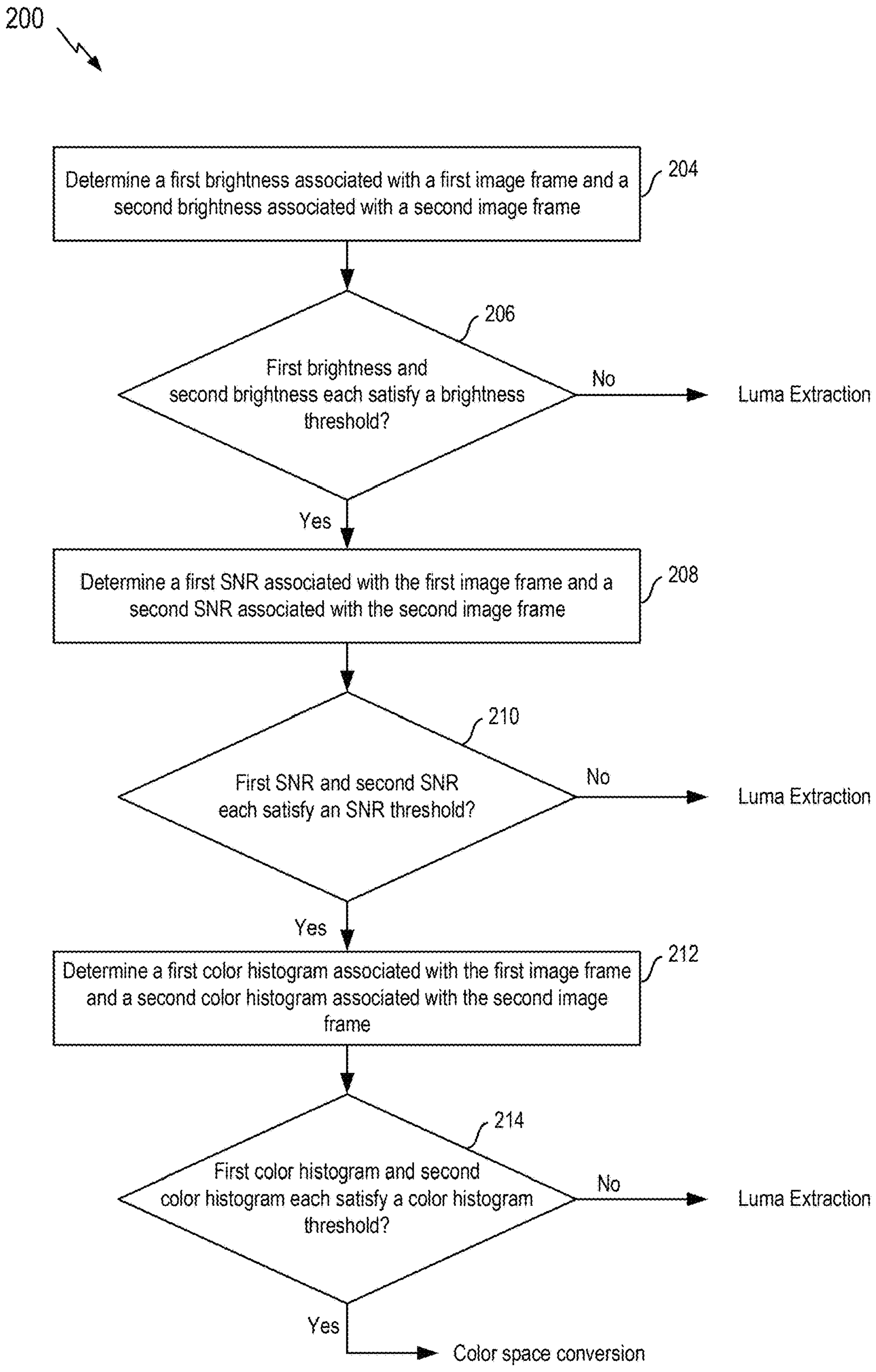
FIG. 2 depicts an example workflow for color-enhanced or luma-based feature selection.

In certain aspects, the characteristic(s) associated with each image frame 102(1), 102(2) include brightness, SNR, and/or a color histogram. As shown in FIG. 2, control unit 104 may use one or more of these characteristic(s) to determine whether color space conversion is permitted, at blocks 106(1), 106(2) in workflow 100.

For example, FIG. 2 depicts an example workflow 200 for color-enhanced or luma-based feature selection. For example, workflow 200 provides an example methodology that may be used to determine whether to (1) perform color space conversion such that image matching in workflow 100 is performed using color-enhanced features or (2) perform luma extraction such that image matching in workflow 100 is performed using luma-based features.

For ease of explanation, workflow 200 may be described with respect to FIG. 1. For example, workflow 200 may be used by control unit 104 in FIG. 1 to determine whether to perform color space conversation or luma extraction at blocks 106(1), 106(2) for image frame 102(1) and image frame 102(2), respectively.

Workflow 200 begins, at block 204, with control unit 104 determining a first brightness associated with image frame 102(1) (e.g., a first image frame) and a second brightness associated with image frame 102(2) (e.g., a second image frame). The first brightness may be an average brightness across all pixels, measured in lux (lx), in image frame 102(1). Similarly, the second brightness may be an average brightness across all pixels, measured in lux, in image frame 102(2). Control unit 104 may determine the first brightness based on image frame information 112(1). Control unit 104 may determine the second brightness based on image frame information 112(2).

Workflow 200 proceeds, at block 206, with control unit 104 determining whether the first brightness and the second brightness each satisfy a brightness threshold. For example, control unit 104 may determine (1) whether the first brightness is greater than a brightness threshold and (2) whether the second brightness is greater than the brightness threshold.

If the first brightness is less than the brightness threshold, if the second brightness is less than the brightness threshold, or both, then control unit 104 determines that luma extraction should be performed at blocks 106(1), 106(2). Alternatively, if the first brightness and the second brightness are both greater than the brightness threshold (e.g., satisfy the brightness threshold), then workflow 200 proceeds to block 208. Satisfaction of the brightness threshold indicates that image frames 102(1), 102(2) are sufficiently bright to perform color space conversion.

For example, the brightness threshold may be equal to 100 lux. If the first brightness and/or the second brightness is less than 100 lux, then image frame 102(1) and/or image frame 102(2) may be considered as low light image frame(s), respectively. Accordingly, luma extraction may be performed at blocks 106(1), 106(2).

At block 208, control unit 104 determines a first SNR associated with image frame 102(1) (e.g., a first image frame) and a second SNR associated with image frame 102(2) (e.g., a second image frame). The first SNR may be computed as the signal strength associated with image frame 102(1) divided by the noise strength associated with image frame 102(1). Similarly, the second SNR may be computed as the signal strength associated with image frame 102(2) divided by the noise strength associated with image frame 102(2).

In certain aspects, the first SNR and/or the second SNR is computed by (1) capturing a neutral patch in image frame 102(1) and/or image frame 102(2), (2) cropping the center of the neutral patch (e.g., 100-200×100-200 pixels), (3) computing the mean value for the cropped pixels, (4) computing the standard deviation for the cropped pixels, and (5) determining the SNR as the ratio of the mean value to the standard deviation (e.g., SNR=mean value/standard deviation).

A lower first SNR determined for image frame 102(1) may indicate that image frame 102(1) is noisy, grainy, and/or poor, while a higher first SNR may indicate that image frame 102(1) is a better image with less noise and/or better contrast. The same may be true for the second SNR determined for image frame 102(2).

In certain aspects, control unit 104 may determine the first SNR based on image frame information 112(1). In certain aspects, control unit 104 may determine the second SNR based on image frame information 112(2).

Workflow 200 proceeds, at block 210, with control unit 104 determining whether the first SNR and the second SNR each satisfy an SNR threshold. For example, control unit 104 may determine (1) whether the first SNR is greater than an SNR threshold and (2) whether the second SNR is greater than the SNR threshold.

If the first SNR is less than the SNR threshold, if the second SNR is less than the brightness threshold, or both, then control unit 104 determines that luma extraction should be performed at blocks 106(1), 106(2). Alternatively, if the first SNR and the second SNR are both greater than the SNR threshold (e.g., satisfy the SNR threshold), then workflow 200 proceeds to block 212. Satisfaction of the SNR threshold indicates that noise present in image frames 102(1), 102(2) is not so significant that it would adversely affect color space conversion performance.

For example, the SNR threshold may be equal to five (e.g., thereby indicating that luma extraction may be used for any image frame with a signal strength less than five times the noise strength). If the first SNR and/or the second SNR is less than five, then image frame 102(1) and/or image frame 102(2) may be characterized as noisy, grainy, and/or poor image frame(s). Accordingly, luma extraction may be performed at blocks 106(1), 106(2).

At block 212, control unit 104 determines a first color histogram associated with image frame 102(1) (e.g., a first image frame) and a second color histogram associated with image frame 102(2) (e.g., a second image frame). Control unit 104 may determine the first color histogram based on image frame information 112(1). Control unit 104 may determine the second color histogram based on image frame information 112(2). The first color histogram may indicate an amount of variance in color for the entire image frame 102(1). The second color histogram may indicate an amount of variance in color for the entire image frame 102(2).

Workflow 200 proceeds, at block 214, with control unit 104 determining whether the first color histogram and the second color histogram each satisfy a color histogram threshold. For example, control unit 104 may determine (1) whether the amount of color variance in image frame 102(1), indicated in the first color histogram, is greater than a threshold amount of color variance (e.g., the color histogram threshold) and (2) whether the amount of color variance in image frame 102(2), indicated in the second color histogram, is greater than the threshold amount of color variance.

If the first color histogram is less than the color histogram threshold, if the second color histogram is less than the color histogram threshold, or both, then control unit 104 determines that luma extraction should be performed at blocks 106(1), 106(2). Alternatively, if the first color histogram and the second color histogram are both greater than the color histogram threshold (e.g., satisfy the color histogram threshold, or the threshold amount of color variance), then control unit 104 determines that color space conversion should be performed at blocks 106(1), 106(2).

For example, the first color histogram may be created in an RGB color space. Accordingly, in certain aspects, an amount of color variance associated with image frame 102(1) may be determined as the average color variance across three different histograms of red (R), green (G), and blue (B) associated with image frame 102(1). This average color variance may be compared to the color histogram threshold to determine whether luma extraction or color space conversion should be performed.

In certain other aspects, an amount of color variance associated with image frame 102(1) may be determined as the standard deviation for color variance across the three different histograms of R, G, and B associated with image frame 102(1). This standard deviation in color variance may be compared to the color histogram threshold to determine whether luma extraction or color space conversion should be performed. For example, the color histogram threshold may be equal to a standard deviation of ten. Thus, if the standard deviation in color variance for image frame 102(1) is less than ten, then luma extraction may be performed at blocks 106(1), 106(2), otherwise color space conversion may be performed. In some other cases, the color histogram threshold may be equal to a standard deviation of twenty.

It is noted that the brightness characteristics, the SNRs, and the color histograms are only example characteristics and the brightness threshold, the SNR threshold, and the color histogram threshold are only example criteria. Thus, other characteristics and/or criteria may be considered in other examples. In such examples, generally, if all characteristics meet associated criteria then perform color space conversion may be performed. However, if any one of the characteristics do not meet associated criteria, then color space conversion may not be performed.

Returning to FIG. 1, control unit 104 may use this determination (e.g., determined via workflow 200) to trigger the color space conversion or luma extraction for image frames 102(1), 102(2) at blocks 106(1), 106(2).

Workflow 100 then proceeds, at blocks 108(1), 108(2), with performing feature extraction. As described herein, feature extraction (e.g., including feature detection and feature description) involves extracting features associated with image frames 102(1), 102(2). Extracting features includes (1) identifying features as areas (e.g., patches) in image frames 102(1), 102(2) and (2) generating a feature descriptor for each identified feature.

For example, image frame 102(1) may be a 2D image of a 3D office space. The pixels of image frame 102(1) may be divided into multiple features. Each pixel may be associated with one or more features. For example, pixel(s) may be reused for different features. Each feature in image frame 102(1) may include an area (e.g., generally a rectangular area) surrounding one or more pixels in image frame 102(1). A descriptor may be generated for each feature to create a representation of each feature that captures its distinctive characteristics.

A feature size of each feature extracted from image frames 102(1), 102(2) may be controlled by control unit 104. For example, different feature sizes may be considered for feature extraction, at blocks 108(1), 108(2) in workflow 100. Control unit 104 may be responsible for selecting which feature size to use for image matching. In certain aspects, control unit 104 makes this selection based on a first frame resolution associated with image frame 102(1) and/or a second frame resolution associated with image frame 102(2). Control unit 104 may determine (1) the first frame resolution based on image frame information 112(1) associated with image frame 102(1) and (2) the second frame resolution based on image frame information 112(2) associated with image frame 102(2). For example, in some cases, the first frame resolution is explicitly included in image frame information 112(1) and the second frame resolution is explicitly included in image frame information 112(2).

Figure 3:
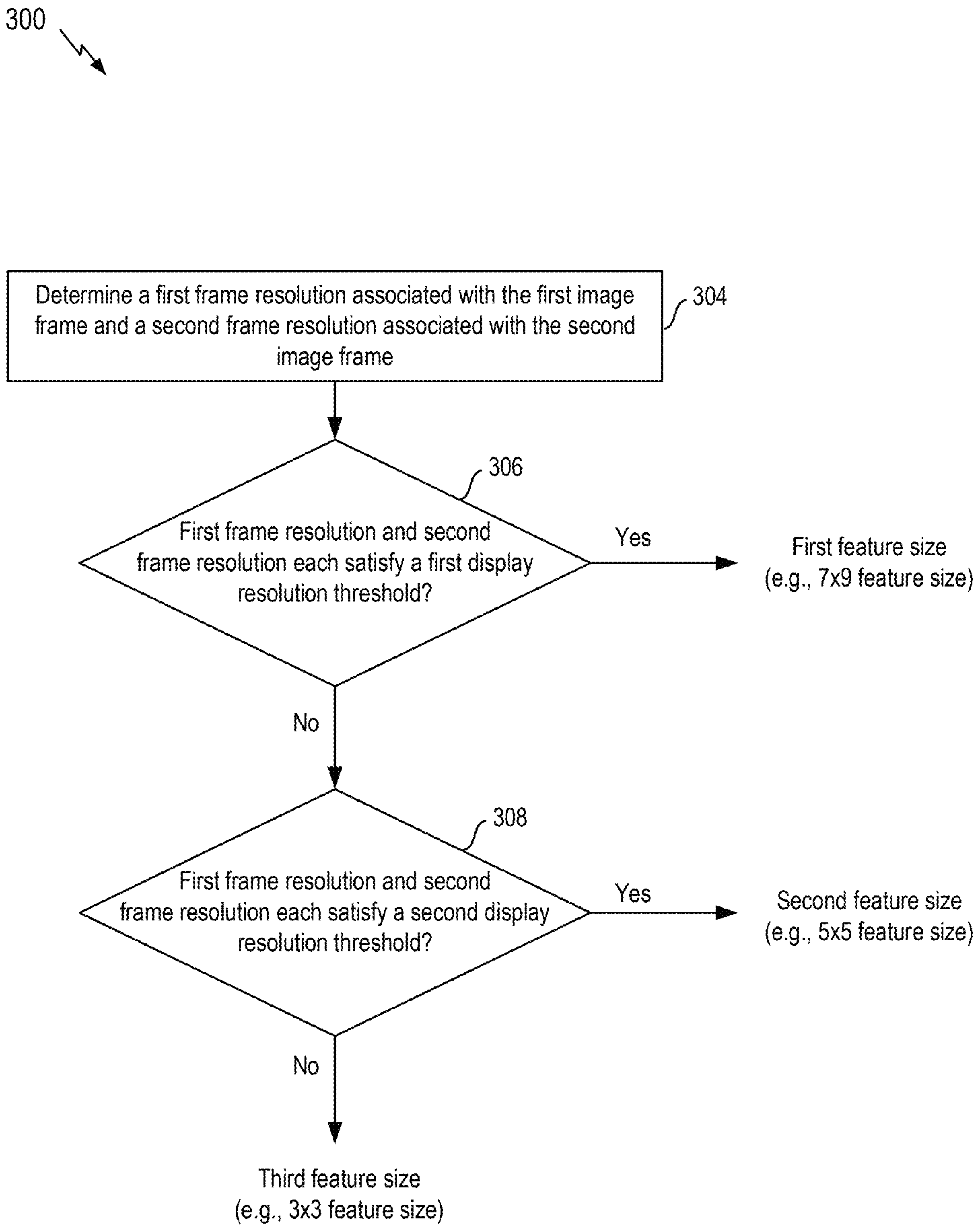
FIG. 3 depicts an example workflow for feature size determination.

FIG. 3 depicts an example workflow 300 for feature size determination based on frame resolution(s). For example, workflow 300 provides an example methodology that may be used to determine a feature size to use for feature extraction in image matching techniques. For case of explanation, workflow 300 may be described with respect to FIG. 1. For example, workflow 300 may be used by control unit 104 in FIG. 1 to determine a feature size that may be used when performing feature extraction at blocks 108(1), 108(2) for image frame 102(1) and image frame 102(2), respectively.

Workflow 300 begins, at block 304, with control unit 104 determining a first frame resolution associated with image frame 102(1) (e.g., a first image frame) and a second frame resolution associated with image frame 102(2) (e.g., a second image frame). Control unit 104 may determine the first frame resolution based on image frame information 112(1). For example, image frame information 112(1) may explicitly indicate the first frame resolution. The first frame resolution may indicate a number of pixels included in image frame 102(1). Control unit 104 may determine the second frame resolution based on image frame information 112(2). For example, image frame information 112(2) may explicitly indicate the second frame resolution. The second frame resolution may indicate a number of pixels included in image frame 102(2).

Workflow 300 proceeds, at block 306, with control unit 104 determining whether the first frame resolution and the second frame resolution each satisfy a first display resolution threshold. For example, control unit 104 may determine whether the first frame resolution is greater than a first display resolution threshold, or more specifically, whether the number of pixels included in image frame 102(1) is greater than a first threshold number of pixels associated with the first display resolution threshold. Further, control unit 104 may determine whether the second frame resolution is greater than the first display resolution threshold, or more specifically, whether the number of pixels included in image frame 102(2) is greater than the first threshold number of pixels associated with the first display resolution threshold.

In certain aspects, the first display resolution threshold is a quarter video graphics array (QVGA) threshold, which is a display resolution threshold of 320×240 pixels. Thus, control unit 104 may determine (1) whether the number of pixels included in image frame 102(1) is greater than 320×240 pixels and (2) whether the number of pixels included in image frame 102(2) is greater than 320×240 pixels.

If the first frame resolution and the second frame resolution are both greater than the first display resolution threshold (e.g., satisfy the first display resolution threshold), then control unit 104 determines that a first feature size should be used for feature extraction at blocks 108(1), 108(2) in workflow 100. In certain aspects, the first feature size comprises a 7×9 feature size indicating that each feature extracted from image frames 102(1), 102(2) should be associated with a 7×9 patch, containing 63 pixels, in image frame 102(1) or image frame 102(2). Further, the descriptor generated for each feature may be generated based on the 7×9 patch associated with each feature. Satisfaction of the first display resolution threshold indicates that image frames 102(1), 102(2) have sufficient resolution to allow for use of a larger feature size, such as the 7×9 feature size.

Alternatively, if the first frame resolution is less than the first display resolution threshold, if the second frame resolution is less than the first display resolution threshold, or both, then workflow 300 proceeds to block 308.

At block 308, control unit 104 determines whether the first frame resolution and the second frame resolution each satisfy a second display resolution threshold. For example, control unit 104 may determine whether the first frame resolution is greater than a second display resolution threshold, or more specifically, whether the number of pixels included in image frame 102(1) is greater than a second threshold number of pixels associated with the second display resolution threshold. Further, control unit 104 may determine whether the second frame resolution is greater than the second display resolution threshold, or more specifically, whether the number of pixels included in image frame 102(2) is greater than the second threshold number of pixels associated with the second display resolution threshold.

The second display resolution threshold may be smaller than the first display resolution threshold. In certain aspects, the second display resolution threshold is a quarter QVGA threshold, which is a display resolution threshold of 160×120 pixels. Thus, control unit 104 may determine (1) whether the number of pixels included in image frame 102(1) is greater than 160×120 pixels and (2) whether the number of pixels included in image frame 102(2) is greater than 160×120 pixels.

If the first frame resolution and the second frame resolution are both greater than the second display resolution threshold (e.g., satisfy the second display resolution threshold), then control unit 104 determines that a second feature size should be used for feature extraction at blocks 108(1), 108(2) in workflow 100. The second feature size may be smaller than the first feature size. In certain aspects, the second feature size comprises a 5×5 feature size indicating that each feature extracted from image frames 102(1), 102(2) should be associated with a 5×5 patch, containing 25 pixels, in image frame 102(1) or image frame 102(2). Further, the descriptor generated for each feature may be generated based on the 5×5 patch associated with each feature. Satisfaction of the second display resolution threshold indicates that image frames 102(1), 102(2) have sufficient resolution to allow for use of a middle feature size, such as a 5×5 feature size.

Alternatively, if the first frame resolution is less than the second display resolution threshold, if the second frame resolution is less than the second display resolution threshold, or both, then control unit 104 determines that a third feature size should be used for feature extraction at blocks 108(1), 108(2) in workflow 100. The third feature size may be smaller than the second feature size. In certain aspects, the third feature size comprises a 3×3 feature size indicating that each feature extracted from image frames 102(1), 102(2) should be associated with a 3×3 patch, containing 9 pixels, in image frame 102(1) or image frame 102(2). Further, the descriptor generated for each feature may be generated based on the 3×3 patch associated with each feature.

It is noted that the first display resolution threshold (320×240 pixels), the second display resolution threshold (160×120 pixels), the first feature size (7×9 feature size), the second feature size (5×5 feature size), and the third feature size (3×3 feature size) are only examples, and other resolutions and/or feature sizes may be considered when using workflow 300.

Returning to FIG. 1, control unit 104 may use this feature size determination (e.g., determined via workflow 300) to trigger the feature extraction for image frames 102(1), 102(2) at blocks 106(1), 106(2) based on the feature size. As such, feature(s) 114(1) (e.g., based on the determined feature size) may be extracted, at block 108(1), from image frame 102(1). Further, features 114(2) (e.g., based on the determined feature size) may be extracted, at block 108(2), from image frame 102(2).

Workflow 100 then proceeds, at block 110, with performing feature matching. As described herein, feature matching may involve determining correspondences between (some or all of) features 114(1) and (some or all of) features 114(2). In certain aspects, feature matching involves computing matching cost(s) 116 between different feature pair(s), where each feature pair includes a first feature from features 114(1) extracted from image frame 102(1) and a second feature from features 114(2) extracted from image frame 102(2). A matching cost 116 ($C_T$), computed for the first feature and the second feature, may be computed according to the following equation:

$$c_T = [(w_1) * (\text{texture measure cost})] + [(w_2) * (\text{chroma distance cost})]$$

where $w_1$ is the adjustable weight corresponding to texture measure cost and $w_2$ is the adjustable weight corresponding to chroma distance cost.

In certain aspects, features 114(1) and features 114(2) are luma-based features, or more specifically, features extracted from luma representations of image frames 102(1), 102(2) (e.g., in cases where luma extraction is performed at blocks 106(1), 106(2)). A matching cost 116 ($C_T$), computed between a first luma-based feature and a second luma-based feature, may be computed according to the following equation:

$$c_T = [(w_1) * (\text{texture measure cost})] = w_L * c_{Luma}$$

where $w_L$ is the adjustable weight corresponding to $C_{Luma}$, and $C_{Luma}$ is the texture measure cost calculated using luma-based features. $C_{Luma}$ may be calculated as the hamming distance between a luma channel of the first luma-based feature and a luma channel of the second luma-based feature. In certain aspects, $w_L$ is equal to one.

In certain other aspects, features 114(1) and features 114(2) are chroma-enhanced features, or more specifically, features extracted from modified image frames created for image frames 102(1), 102(2) during color space conversion.

As described herein, in certain aspects, the modified image frames, created for image frames 102(1), 102(2), comprise image frames in an L*a*b* color space. Thus, each feature in feature(s) 114(1) and features 114(2) (e.g., extracted from the modified image frames) may be associated with (e.g., expressed as) a specific lightness (L*) channel, a specific chroma channel a*, and a specific chroma channel b*.

Figure 4A:
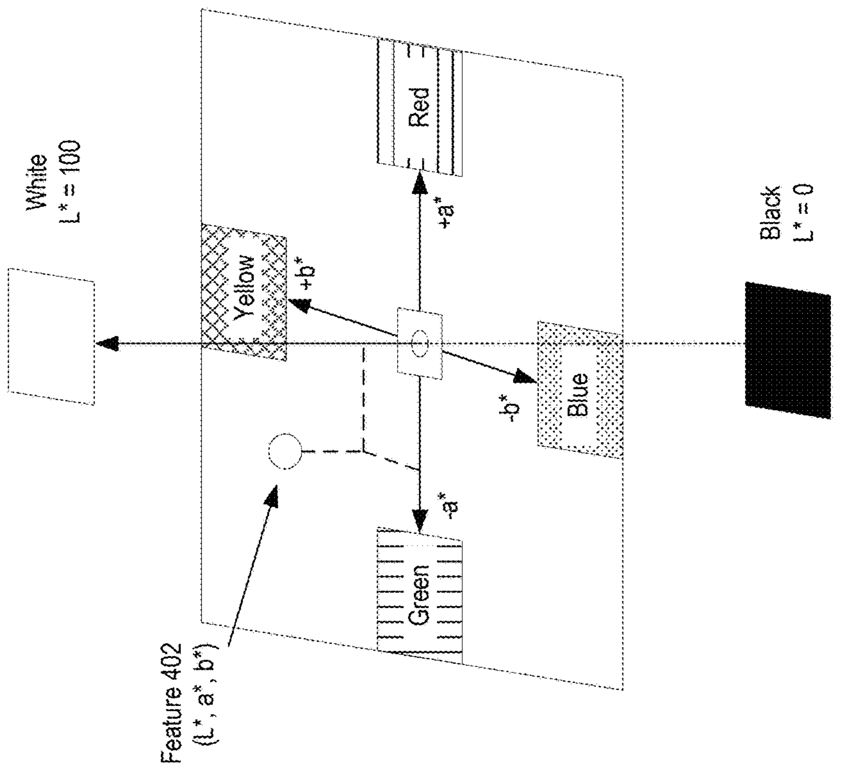
FIG. 4A depicts example aspects related to a lightness channel and chroma channels.

For example, as shown in FIG. 4A, a feature 402 (e.g., a chroma-enhanced feature) may be represented as a lightness (L*) channel between L*=0 and L*=100. Further, feature 402 may be represented as (1) a chroma channel a* between −a* corresponding to a green color and +a* corresponding to a red color and (2) a chroma channel b* between −b* corresponding to a blue color and +b* corresponding to a yellow color.

A matching cost 116 ($C_T$), computed between a first chroma-enhanced feature and a second chroma-enhanced feature, may be computed based on the lightness (L*) channel, the chroma channel a*, and the chroma channel b* associated with each chroma-enhanced feature.

For example, in certain aspects, the matching cost 116 ($C_T$) computed between the first chroma-enhanced feature and the second chroma-enhance feature may be computed according to the following equation:

$$c_T = [(w_1) * (\text{texture measure cost})] + [(w_2) * (\text{chroma distance cost})]$$

$$c_T = [w_L * c_{Lightness}] + [w_a * c_a] + [w_b * c_b] + \left[w_{\sqrt{a2+b2}} * c_{\sqrt{a2+b2}}\right]$$

where $w_L$ is the adjustable weight corresponding to $C_{Lightness}$, and $C_{Lightness}$ is the texture measure cost calculated using chroma-enhanced features. $C_{Lightness}$ may be calculated as the hamming distance between a first lightness (L*) channel associated with the first chroma-enhanced feature and a second lightness (L*) channel associated with the second chroma-enhanced feature. In certain aspects, $w_L$ is equal to one.

Further, $w_a$ is the adjustable weight corresponding to $c_a$, and $c_a$ is a chroma distance cost calculated using chroma-enhanced features. $c_a$ may be calculated as the Euclidean distance between a first chroma channel a* associated with the first chroma-enhanced feature and a second chroma channel a* associated with the second chroma-enhanced feature. In certain aspects, $w_a$ is equal to zero.

Parameter, $w_b$ is the adjustable weight corresponding to $c_b$, and $c_b$ is a chroma distance cost calculated using chroma-enhanced features. $C_b$ may be calculated as the Euclidean distance between a first chroma channel b* associated with the first chroma-enhanced feature and a second chroma channel b* associated with the second chroma-enhanced feature. In certain aspects, $w_b$ is equal to zero.

Further, $w\sqrt{a^3+b^2}$ is the adjustable weight corresponding to $c\sqrt{a^2+b^2}$, and $c\sqrt{a^2+b^2}$ is a chroma distance cost calculated using chroma-enhanced features. $c\sqrt{a^2+b^2}$ may be calculated as the Euclidean distance between (1) a $$\sqrt{\text{first chroma channel } a*^2 + \text{first chroma channel } b*^2}$$

associated with the first chroma-enhanced feature and (2) a $$\sqrt{\text{second chroma channel } a*^2 + \text{second chroma channel } b*^2}$$

associated with the second chroma-enhanced feature. In certain aspects, $w\sqrt{a^2+b^2}$ is equal to 0.5.

Accordingly, in certain aspects, matching cost 116 ($C_T$), computed between the first chroma-enhanced feature and the second chroma-enhanced feature, may be based on four costs and adjustable weight coefficients. An example of the use of four costs to compute the matching cost ($C_T$), between a first chroma-enhanced feature and a second chroma-enhanced feature, is illustrated in FIG. 4B.

Figure 4B:
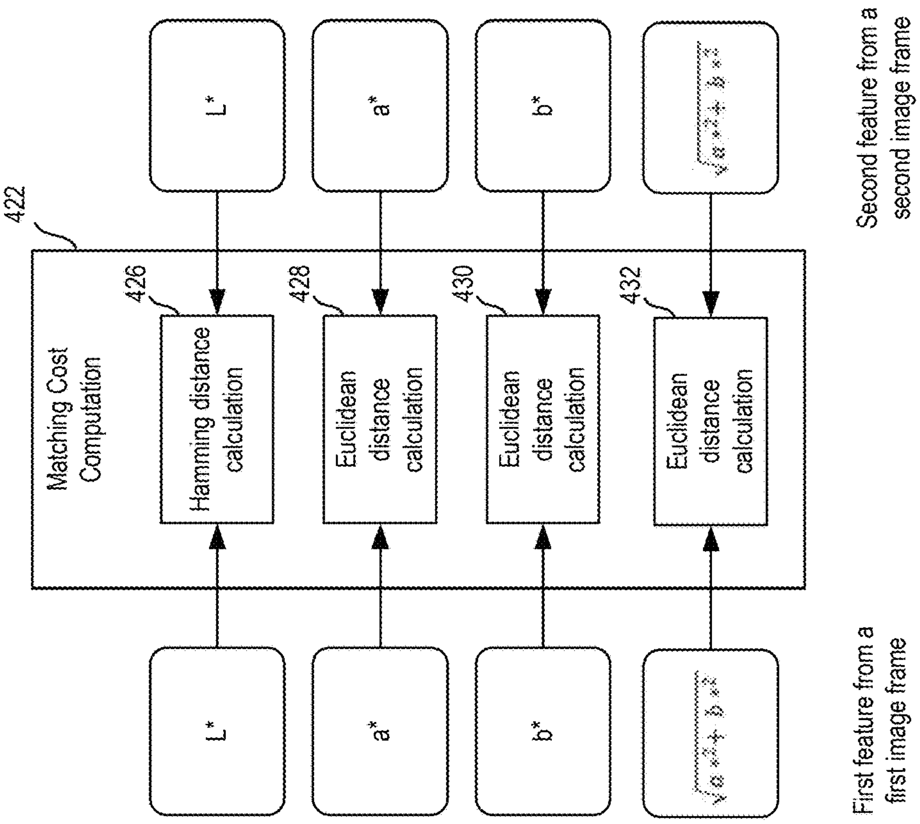
FIG. 4B depicts an example matching cost computation using chroma-enhanced features.

As shown in FIG. 4B, at 426, a first cost may be computed as a Hamming distance between a first lightness (L*) channel associated with the first feature and a second lightness (L*) channel associated with the second feature. At 428, a second cost may be computed as a Euclidean distance between a first chroma channel a* associated with the first feature and a second chroma channel a* associated with the second feature. At 430, a third cost may be computed as a Euclidean distance between a first chroma channel b* associated with the first feature and a second chroma channel b* associated with the second feature. At 432, a fourth cost may be computed as a Euclidean distance between first chroma channels a* and b* as $$\sqrt{\text{first chroma channel } a*^2 + \text{first chroma channel } b*^2}$$

and second chroma channels a* and b* as $$\sqrt{\text{second chroma channel } a*^2 + \text{second chroma channel } b*^2}.$$

The matching cost ($C_T$) computation 422 may be based on each of the four costs determined at 426, 428, 430, and 432.

In certain other aspects, matching cost 116 ($C_T$), computed between the first chroma-enhanced feature and the second chroma-enhanced feature, may be based on three costs (instead of four costs) and adjustable weight coefficients. For example, the matching cost 116 ($C_T$) computed between the first chroma-enhanced feature and the second chroma-enhance feature may be computed according to the following equation:

$$c_T = [(w_1) * (\text{texture measure cost})] + [(w_2) * (\text{chroma distance cost})]$$

$$c_T = [w_L * c_{Lightness}] + [w_a * c_a] + [w_b * c_b]$$

Per the equation, matching cost 116 ($C_T$), computed between the first chroma-enhanced feature and the second chroma-enhanced feature, may be based on a texture measure cost, two chroma distance costs (e.g., three costs) and adjustable weight coefficients. Use of three costs to compute the matching cost ($C_T$), between a first chroma-enhanced feature and a second chroma-enhanced feature, is illustrated in FIG. 4C. As shown at 406, a first cost may be computed as a Hamming distance between a first lightness (L*) channel associated with the first feature and a second lightness (L*) channel associated with the second feature. At 408, a second cost may be computed as a Euclidean distance between a first chroma channel a* associated with the first feature and a second chroma channel a* associated with the second feature. At 410, a third cost may be computed as a Euclidean distance between a first chroma channel b* associated with the first feature and a second chroma channel b* associated with the second feature. The matching cost ($C_T$) computation 412 may be based on each of the three costs determined at 406, 408, and 410.

In certain other aspects, matching cost 116 ($C_T$), computed between the first chroma-enhanced feature and the second chroma-enhanced feature, may be based on two costs (instead of three and four costs) and adjustable weight coefficients. For example, the matching cost 116 ($C_T$) computed between the first chroma-enhanced feature and the second chroma-enhance feature may be computed according to the following equation:

$$c_T = [(w_1) * (\text{texture measure cost})] + [(w_2) * (\text{chroma distance cost})]$$

-continued $$c_T = [w_L * c_{Lightness}] + \left[w_{\sqrt{a2+b2}} * c_{\sqrt{a2+b2}}\right]$$

An example of the use of two costs to compute the matching cost ($C_T$), between a first chroma-enhanced feature and a second chroma-enhanced feature, is illustrated in FIG. 4D.

As shown in FIG. 4D, at 446, a first cost may be computed as a Hamming distance between a first lightness (L*) channel associated with the first feature and a second lightness (L*) channel associated with the second feature. At 448, a second cost may be computed as a Euclidean distance between first chroma channels a* and b* as $$\sqrt{\text{first chroma channel } a*^2 + \text{first chroma channel } b*^2}$$

and second chroma channels a* and b* as $$\sqrt{\text{second chroma channel } a*^2 + \text{second chroma channel } b*^2}.$$

($C_T$) computation 442 may be based on each of the two costs determined at 446 and 448.

In certain aspects, calculation of a matching cost 116 based on two (as shown in FIG. 4D), three (e.g., as shown in FIG. 4C), or four costs (e.g., as shown in FIG. 4A) may be based on the adjustable weight coefficients (e.g., $w_a$, $w_b$, and $w\sqrt{a^2+b^2}$) for each cost term. For example, the default matching cost 116 calculation may be based on four costs, as shown in FIG. 4B. However, if one or more of the adjustable weight coefficients are equal to zero, then the matching cost 116 calculation may be based on three costs or two costs, as shown in FIG. 4C and FIG. 4D, respectively.

In certain aspects, matching cost(s) 116 may be used to understand whether any relationships and/or meaningful connections exist between image frames 102(1), 102(2).

Matching cost(s) 116, determined using workflow 100, may be used for various computer vision tasks. In a first example, matching cost(s) 116 may be used for optical flow estimation, which is a method for estimating object motion in an image or video. The goal of optical flow estimation is to determine the movement of features (and/or pixels) in an image, which can be used for various applications such as object tracking, motion analysis, and video compression. Using matching cost(s) 116, correspondences between similar (or same) features may be determined to enable object motion estimation. In a second example, matching cost(s) 116 may be used for SfM, which is a process of estimating the 3D structure of a scene from a set of 2D images. SfM is used in many applications, such as 3D scanning, augmented reality (AR), and visual SLAM (vSLAM). SfM consists of two main stages: (1) the first stage involves identifying point correspondences between images and (2) the second stage involves incremental reconstruction to generate an estimation of the camera pose for each image and a 3D reconstruction as a sparse point cloud. Matching cost(s) 116, determined using workflow 100, may enable the identification of point correspondences between images, in the first step of SfM. Although only two example cases are described, it is noted that matching cost(s) 116 may be used in various other computer vision tasks, including stereo vision, interest point tracking, visual localization, etc.

Example Operations for Image Matching

Figure 5:
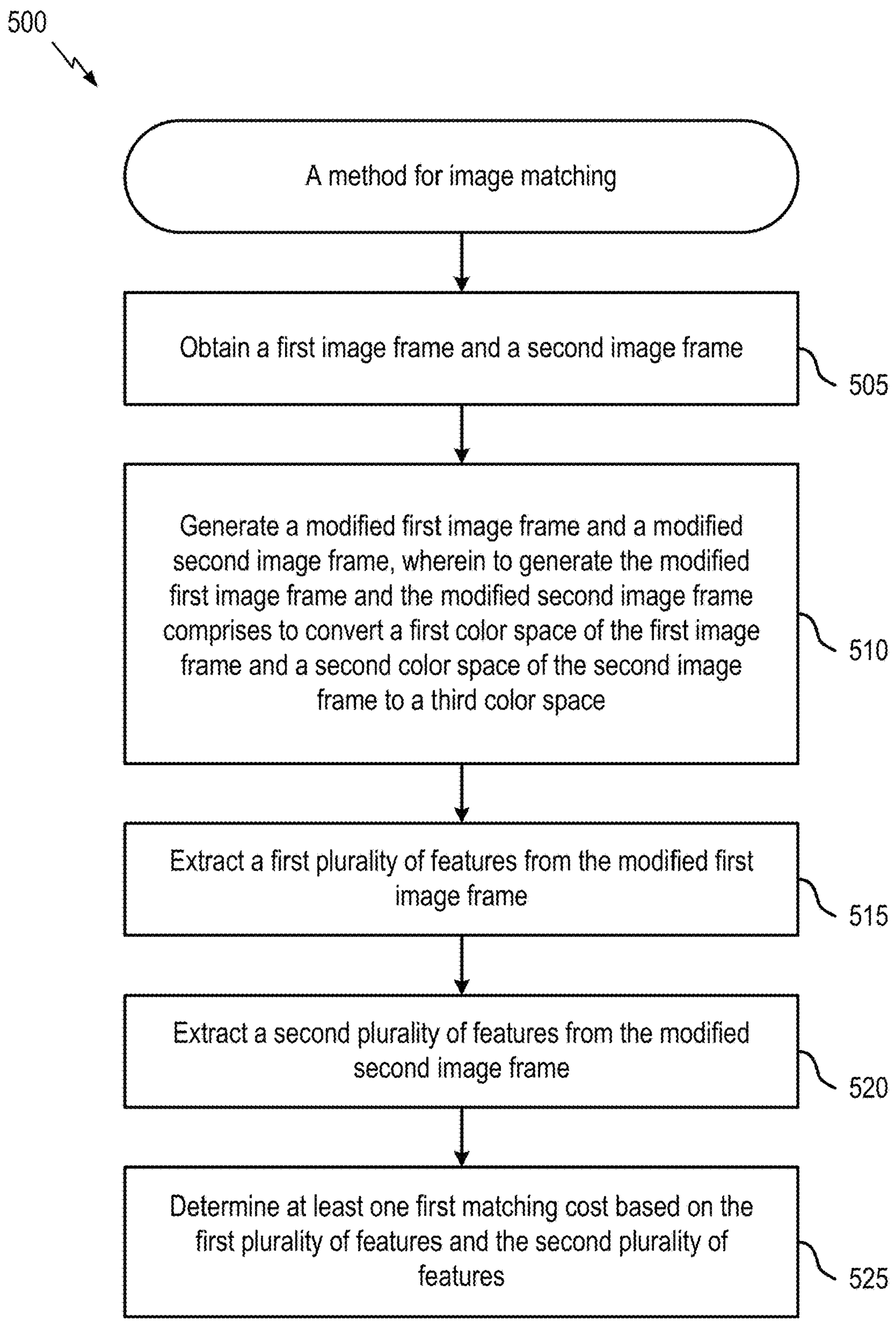
FIG. 5 depicts a method for image matching.

FIG. 5 shows a method 500 for image matching. Method 500 may be performed by one or more processor(s) of a computing device, such as processor(s) 610 of processing system 600 described below with respect to FIG. 6.

Method 500 begins at block 505 with obtaining a first image frame and a second image frame.

Method 500 then proceeds to block 510 with generating a modified first image frame and a modified second image frame, wherein to generate the modified first image frame and the modified second image frame comprises to convert a first color space of the first image frame and a second color space of the second image frame to a third color space.

Method 500 then proceeds to block 515 with extracting a first plurality of features from the modified first image frame.

Method 500 then proceeds to block 520 with extracting a second plurality of features from the modified second image frame.

Method 500 then proceeds to block 525 with determining at least one first matching cost based on the first plurality of features and the second plurality of features.

In certain aspects, block 510 includes generating the modified first image frame and the modified second image frame based on one or more characteristics associated with at least one of the first image frame and the second image frame satisfying one or more criteria.

In certain aspects, the one or more characteristics comprise one or more of: a brightness, a SNR, or a color histogram, and the one or more criteria comprise one or more of: a brightness threshold; an SNR threshold; or a color histogram threshold.

In certain aspects, method 500 further includes obtaining a third image frame and a fourth image frame.

In certain aspects, method 500 further includes extracting a first luma representation of the third image frame and a second luma representation of the fourth image frame based on one or more characteristics associated with at least one of the third image frame or the fourth image frame not satisfying one or more criteria.

In certain aspects, method 500 further includes extracting a third plurality of features from the first luma representation.

In certain aspects, method 500 further includes extracting a fourth plurality of features from the second luma representation.

In certain aspects, method 500 further includes determining at least one second matching cost based on the third plurality of features and the fourth plurality of features.

In certain aspects, the one or more characteristics comprise at least one of: a brightness, a SNR, or a color histogram, and the one or more criteria comprise one or more of: a brightness threshold; an SNR threshold; or a color histogram threshold.

In certain aspects, a feature size of the first plurality of features and the second plurality of features is based on at least one of a first frame resolution associated with the first image frame or a second frame resolution associated with the second image frame.

In certain aspects, the feature size of the first plurality of features and the second plurality of features comprises: a first feature size when at least one of the first frame resolution or the second frame resolution does not satisfy a first display resolution; a second feature size when the first frame resolution and the second frame resolution satisfy a second display resolution; and a third feature size when the first frame resolution and the second frame resolution satisfy the first display resolution and at least one of the first frame resolution or the second frame resolution do not satisfy the second display resolution.

In certain aspects, the first frame resolution and the second frame resolution comprise a same frame resolution.

In certain aspects, block 525 includes, for each first feature of one or more first features of the first plurality of features: determining an individual matching cost between the first feature and each second feature of one or more second features of the second plurality of features.

In certain aspects, determining the individual matching cost between the first feature and each second feature comprises, for each second feature: determining a Hamming distance between a first lightness channel associated with the first feature and a second lightness channel associated with the second feature; determining a first Euclidean distance between a first chroma channel a* associated with the first feature and a second chroma channel a* associated with the second feature; determining a second Euclidean distance between a first chroma channel b* associated with the first feature and a second chroma channel b* associated with the second feature; and computing the individual matching cost based on the Hamming distance, the first Euclidean distance, and the second Euclidean distance.

In certain aspects, determining the individual matching cost between the first feature and each second feature further comprises, for each second feature: determining a third Euclidean distance between a first square root value associated with the first feature and a second square root value associated with the second feature, wherein: the first square root value is based on the first chroma channel a* and the first chroma channel b*; the second square root value is based on the second chroma channel a* and the second chroma channel b*; and computing the individual matching cost further based on the third Euclidean distance.

Figure 6:
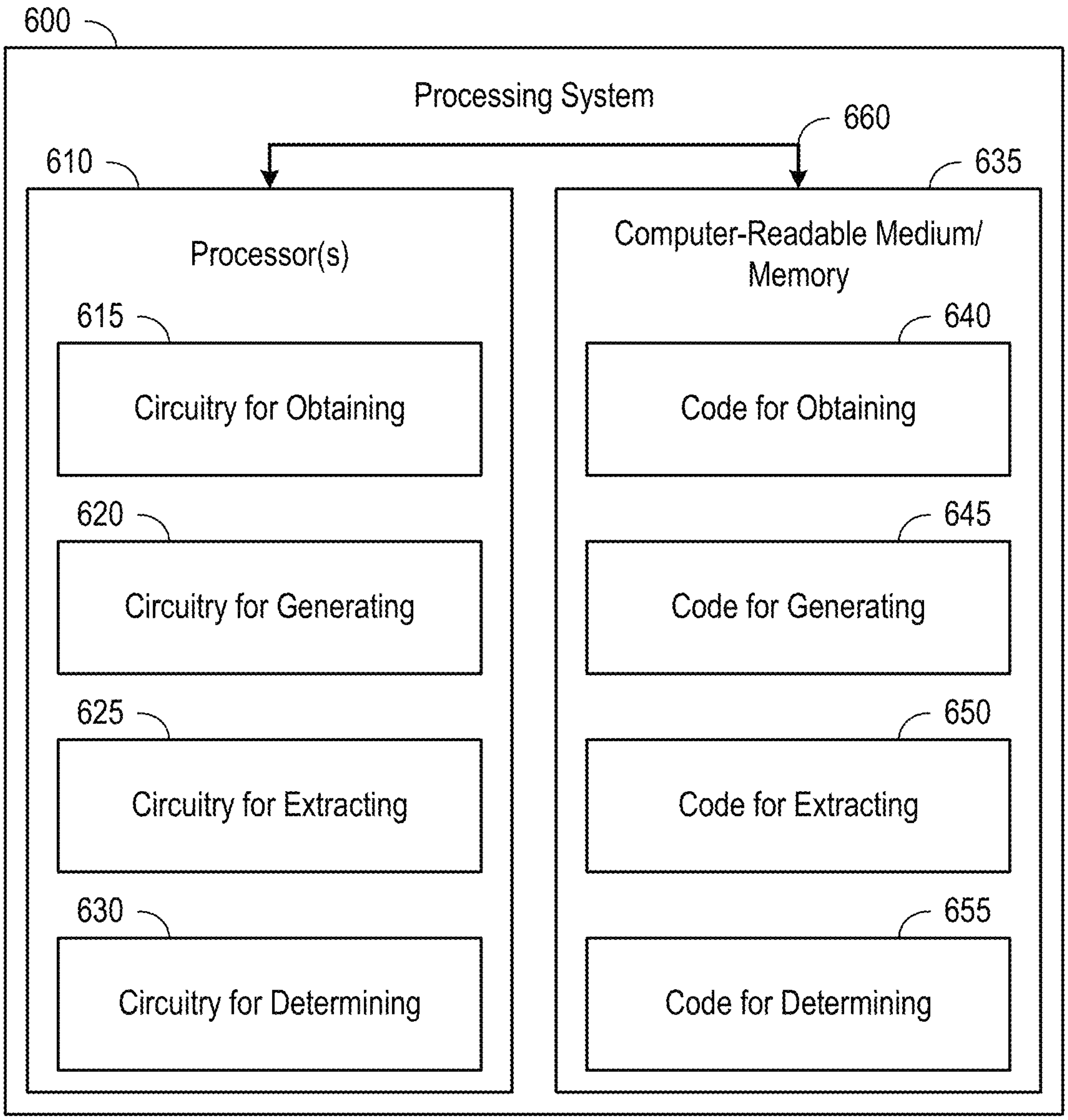
FIG. 6 depicts an example processing system.

In certain aspects, determining the individual matching cost between the first feature and each second feature comprises, for each second feature: determining a Hamming distance between a first lightness channel associated with the first feature and a second lightness channel associated with the second feature; determining a Euclidean distance between a first square root value associated with the first feature and a second square root value associated with the second feature, wherein: the first square root value is based on a first chroma channel a* associated with the first feature and a first chroma channel b* associated with the first feature; and the second square root value is based on a second chroma channel a* associated with the second feature and a first chroma channel b* associated with the first feature; and computing the individual matching cost based on the Hamming distance and the Euclidean distance In certain aspects, method 500, or any aspect related to it, may be performed by an apparatus, such as processing system 600 of FIG. 6, which includes various components operable, configured, or adapted to perform the method 500. Processing system 600 is described below in further detail.

Note that FIG. 5 is just one example of a method, and other methods including fewer, additional, or alternative operations are possible consistent with this disclosure.

Example Processing System for Image Matching

FIG. 6 depicts an example processing system 600 configured to perform various aspects described herein, including, for example, method 500 as described above with respect to FIG. 5.

Processing system 600 includes one or more processors 610. In various aspects, the one or more processors 610 may be representative of one or more of a receive processor, a transmit processor, and/or a controller/processor. The one or more processors 610 are coupled to a computer-readable medium/memory 635 via a bus 660. In certain aspects, the computer-readable medium/memory 635 is configured to store instructions (e.g., computer-executable code) that when executed by the one or more processors 610, enable and cause the one or more processors 610 to perform the method 500 described with respect to FIG. 5, or any aspect related to it, including any operations described in relation to FIG. 5. Note that reference to a processor performing a function of processing system 600 may include one or more processors performing that function of processing system 600, such as in a distributed fashion.

In the depicted example, computer-readable medium/memory 635 stores code for obtaining 640, code for generating 645, code for extracting 650, and code for determining 655. Processing of the code 640-655 may enable and cause the processing system 600 to perform the method 500 described with respect to FIG. 5, or any aspect related to it.

The one or more processors 610 include circuitry configured to implement (e.g., execute) the code stored in the computer-readable medium/memory 635, including circuitry for obtaining 615, circuitry for generating 620, circuitry for extracting 625, and circuitry for determining 630. Processing with circuitry 615-630 may enable and cause the processing system 600 to perform the method 500 described with respect to FIG. 5, or any aspect related to it.

More generally, means for obtaining, generating, extracting, or determining may include one or more processors 610 of the processing system 600 in FIG. 6.

EXAMPLE CLAUSES

Implementation examples are described in the following numbered clauses:

Clause 1: A method for wireless communications by an apparatus comprising: obtaining a first image frame and a second image frame; generating a modified first image frame and a modified second image frame, wherein to generate the modified first image frame and the modified second image frame comprises to convert a first color space of the first image frame and a second color space of the second image frame to a third color space; extracting a first plurality of features from the modified first image frame; extracting a second plurality of features from the modified second image frame; and determining at least one first matching cost based on the first plurality of features and the second plurality of features.

Clause 2: The method of Clause 1, wherein generating the modified first image frame and the modified second image frame comprises generating the modified first image frame and the modified second image frame based on one or more characteristics associated with at least one of the first image frame and the second image frame satisfying one or more criteria.

Clause 3: The method of Clause 2, wherein: the one or more characteristics comprise one or more of: a brightness, a SNR, or a color histogram, and the one or more criteria comprise one or more of: a brightness threshold; an SNR threshold; or a color histogram threshold.

Clause 4: The method of any one of Clauses 1-3, further comprising: obtaining a third image frame and a fourth image frame; extracting a first luma representation of the third image frame and a second luma representation of the fourth image frame based on one or more characteristics associated with at least one of the third image frame or the fourth image frame not satisfying one or more criteria; extracting a third plurality of features from the first luma representation; extracting a fourth plurality of features from the second luma representation; and determining at least one second matching cost based on the third plurality of features and the fourth plurality of features.

Clause 5: The method of Clause 4, wherein: the one or more characteristics comprise at least one of: a brightness, a SNR, or a color histogram, and the one or more criteria comprise one or more of: a brightness threshold; an SNR threshold; or a color histogram threshold.

Clause 6: The method of any one of Clauses 1-5, wherein a feature size of the first plurality of features and the second plurality of features is based on at least one of a first frame resolution associated with the first image frame or a second frame resolution associated with the second image frame.

Clause 7: The method of Clause 6, wherein the feature size of the first plurality of features and the second plurality of features comprises: a first feature size when at least one of the first frame resolution or the second frame resolution does not satisfy a first display resolution; a second feature size when the first frame resolution and the second frame resolution satisfy a second display resolution; and a third feature size when the first frame resolution and the second frame resolution satisfy the first display resolution and at least one of the first frame resolution or the second frame resolution do not satisfy the second display resolution.

Clause 8: The method of Clause 6, wherein the first frame resolution and the second frame resolution comprise a same frame resolution.

Clause 9: The method of any one of Clauses 1-8, wherein determining the at least one first matching cost based on the first plurality of features and the second plurality of features comprises: for each first feature of one or more first features of the first plurality of features: determining an individual matching cost between the first feature and each second feature of one or more second features of the second plurality of features.

Clause 10: The method of Clause 9, wherein determining the individual matching cost between the first feature and each second feature comprises, for each second feature: determining a Hamming distance between a first lightness channel associated with the first feature and a second lightness channel associated with the second feature; determining a first Euclidean distance between a first chroma channel a* associated with the first feature and a second chroma channel a* associated with the second feature; determining a second Euclidean distance between a first chroma channel b* associated with the first feature and a second chroma channel b* associated with the second feature; and computing the individual matching cost based on the Hamming distance, the first Euclidean distance, and the second Euclidean distance.

Clause 11: The method of Clause 10, wherein determining the individual matching cost between the first feature and each second feature further comprises, for each second feature: determining a third Euclidean distance between a first square root value associated with the first feature and a second square root value associated with the second feature, wherein: the first square root value is based on the first chroma channel a* and the first chroma channel b*; the second square root value is based on the second chroma channel a* and the second chroma channel b*; and computing the individual matching cost further based on the third Euclidean distance.

Clause 12: The method of Clause 9, wherein determining the individual matching cost between the first feature and each second feature comprises, for each second feature: determining a Hamming distance between a first lightness channel associated with the first feature and a second lightness channel associated with the second feature; determining a Euclidean distance between a first square root value associated with the first feature and a second square root value associated with the second feature, wherein: the first square root value is based on a first chroma channel a* associated with the first feature and a first chroma channel b* associated with the first feature; and the second square root value is based on a second chroma channel a* associated with the second feature and a first chroma channel b* associated with the first feature; and computing the individual matching cost based on the Hamming distance and the Euclidean distance.

Clause 13: One or more apparatuses, comprising: one or more memories comprising executable instructions; and one or more processors configured to execute the executable instructions and cause the one or more apparatuses to perform a method in accordance with any one of Clauses 1-12.

Clause 14: One or more apparatuses, comprising: one or more memories; and one or more processors, coupled to the one or more memories, configured to cause the one or more apparatuses to perform a method in accordance with any one of Clauses 1-12.

Clause 15: One or more apparatuses, comprising: one or more memories; and one or more processors, coupled to the one or more memories, configured to perform a method in accordance with any one of Clauses 1-12.

Clause 16: One or more apparatuses, comprising means for performing a method in accordance with any one of Clauses 1-12.

Clause 17: One or more non-transitory computer-readable media comprising executable instructions that, when executed by one or more processors of one or more apparatuses, cause the one or more apparatuses to perform a method in accordance with any one of Clauses 1-12.

Clause 17: One or more computer program products embodied on one or more computer-readable storage media comprising code for performing a method in accordance with any one of Clauses 1-12.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus, comprising:
- one or more memories; and
- one or more processors coupled to the one or more memories, the one or more processors being configured to cause the apparatus to:
  - obtain a first image frame and a second image frame;
  - generate a modified first image frame and a modified second image frame, wherein to generate the modified first image frame and the modified second image frame comprises to convert a first color space of the first image frame and a second color space of the second image frame to a third color space;
  - extract a first plurality of features from the modified first image frame;
  - extract a second plurality of features from the modified second image frame;
  - determine a plurality of first matching costs for a plurality of feature pairs, wherein for each feature pair of the plurality of feature pairs;
    - the feature pair includes a respective first feature from the first plurality of features and a respective second feature from the second plurality of features, and
    - the respective first matching cost, of the plurality of first matching costs, determined for the feature pair quantifies a respective correspondence between the respective first feature and the respective second feature of the feature pair; and
  - compare the plurality of first matching costs to identify one or more feature pairs, from the plurality of feature pairs, as corresponding feature pairs between the modified first image frame and the modified second image frame.

2. The apparatus of claim 1, wherein to cause the apparatus to generate the modified first image frame and the modified second image frame, the one or more processors are configured to cause the apparatus to generate the modified first image frame and the modified second image frame based on one or more characteristics associated with at least one of the first image frame or the second image frame satisfying one or more criteria.

3. The apparatus of claim 2, wherein:
- the one or more characteristics comprise one or more of:
  - a brightness;
  - a signal-to-noise ratio (SNR); or
  - a color histogram, and
- the one or more criteria comprise one or more of:
  - a brightness threshold;
  - an SNR threshold; or
  - a color histogram threshold.

4. The apparatus of claim 1, wherein the one or more processors are configured to cause the apparatus to:
- obtain a third image frame and a fourth image frame;
- extract a first luma representation of the third image frame and a second luma representation of the fourth image frame based on one or more characteristics associated with at least one of the third image frame or the fourth image frame not satisfying one or more criteria;
- extract a third plurality of features from the first luma representation;
- extract a fourth plurality of features from the second luma representation; and
- determine at least one second matching cost based on the third plurality of features and the fourth plurality of features.

5. The apparatus of claim 4, wherein:
- the one or more characteristics comprise at least one of:
  - a brightness;
  - a signal-to-noise ratio (SNR); or
  - a color histogram, and
- the one or more criteria comprise one or more of:
  - a brightness threshold;
  - an SNR threshold; or
  - a color histogram threshold.

6. The apparatus of claim 1, wherein a feature size of the first plurality of features and the second plurality of features is based on at least one of a first frame resolution associated with the first image frame or a second frame resolution associated with the second image frame.

7. The apparatus of claim 6, wherein the feature size of the first plurality of features and the second plurality of features comprises:
- a first feature size when at least one of the first frame resolution or the second frame resolution does not satisfy a first display resolution;
- a second feature size when the first frame resolution and the second frame resolution satisfy a second display resolution; and
- a third feature size when the first frame resolution and the second frame resolution satisfy the first display resolution and at least one of the first frame resolution or the second frame resolution does not satisfy the second display resolution.

8. The apparatus of claim 6, wherein the first frame resolution and the second frame resolution comprise a same frame resolution.

9. The apparatus of claim 1, wherein each feature pair of a subset of feature pairs from the plurality of feature pairs comprises:
- a same first feature of the first plurality of features, and
- a different second feature of the second plurality of features.

10. The apparatus of claim 1, wherein to cause the apparatus to determine the plurality of first matching costs comprises to, for a first feature pair of the plurality of feature pairs:

determine a Hamming distance between a first lightness channel associated with the respective first feature of the first feature pair and a second respective lightness channel associated with the respective second feature of the first feature pair;

determine a first Euclidean distance between a first chroma channel a* associated with the respective first feature of the first feature pair and a second chroma channel a* associated with the respective second feature of the first feature pair, determine a second Euclidean distance between a first chroma channel b* associated with the respective first feature of the first feature pair and a second chroma channel b* associated with the respective second feature of the first feature pair; and compute the respective first matching cost, for the first feature pair based on the Hamming distance, the first Euclidean distance, and the second Euclidean distance.

11. The apparatus of claim 10, wherein;

to cause the apparatus to determine the plurality of first matching costs further comprises to, for the first feature pair:

determine a third Euclidean distance between a first square root value associated with the respective first feature of the first feature pair and a second square root value associated with the respective second feature of the first feature pair, the first square root value is based on the first chroma channel a* and the first chroma channel b*, the second square root value is based on the second chroma channel a* and the second chroma channel b*, and to cause the apparatus to compute the respective first matching cost for the first feature pair, the one or more processors are configured to cause the apparatus to compute the respective first matching cost further based on the third Euclidean distance.

12. The apparatus of claim 1, wherein;

to cause the apparatus to determine the plurality of first matching costs comprises to, for a first feature pair of the plurality of feature pairs:

determine a Hamming distance between a first lightness channel associated with the respective first feature of the first feature pair and a second respective lightness channel associated with the respective second feature of the first feature pair;

determine a Euclidean distance between a first square root value associated with the respective first feature of the first feature pair and a second square root value associated with the respective second feature of the first feature pair; and compute the respective first matching cost, for the first feature pair, based on the Hamming distance and the Euclidean distance, the first square root value is based on a first chroma channel a* associated with the respective first feature of the first feature pair and a first chroma channel b* associated with the respective second feature of the first feature pair, and the second square root value is based on a second chroma channel a* associated with the respective second feature of the first feature pair and a first chroma channel b* associated with the respective first feature of the first feature pairs.

13. A method, comprising:

obtaining a first image frame and a second image frame;

generating a modified first image frame and a modified second image frame, wherein to generating the modified first image frame and the modified second image frame comprises converting a first color space of the first image frame and a second color space of the second image frame to a third color space;

extracting a first plurality of features from the modified first image frame;

extracting a second plurality of features from the modified second image frame;

determining a plurality of first matching costs for a plurality of feature pairs, wherein for each feature pair of the plurality of feature pairs:

the feature pair includes a respective first feature from the first plurality of features and a respective second feature from the second plurality of features, and the respective first matching cost of the plurality of first matching costs, determined for the feature pair quantifies a respective correspondence between the respective first feature and the respective second feature of the feature pair; and comparing the plurality of first matching costs to identify one or more feature pairs, from the plurality of feature pairs, as corresponding feature pairs between the modified first image frame and the modified second image frame.

14. The method of claim 13, wherein generating the modified first image frame and the modified second image frame comprises generating the modified first image frame and the modified second image frame based on one or more characteristics associated with at least one of the first image frame and or the second image frame satisfying one or more criteria.

15. The method of claim 14, wherein:

the one or more characteristics comprise one or more of:

a brightness;

a signal-to-noise ratio (SNR); or a color histogram, and the one or more criteria comprise one or more of:

a brightness threshold;

an SNR threshold; or a color histogram threshold.

16. The method of claim 13, further comprising:

obtaining a third image frame and a fourth image frame;

extracting a first luma representation of the third image frame and a second luma representation of the fourth image frame based on one or more characteristics associated with at least one of the third image frame or the fourth image frame not satisfying one or more criteria;

extracting a third plurality of features from the first luma representation;

extracting a fourth plurality of features from the second luma representation; and determining at least one second matching cost based on the third plurality of features and the fourth plurality of features.

17. The method of claim 16, wherein:

the one or more characteristics comprise at least one of:

a brightness;

a signal-to-noise ratio (SNR); or a color histogram, and the one or more criteria comprise one or more of:

a brightness threshold;

an SNR threshold; or a color histogram threshold.

18. One or more non-transitory computer-readable media comprising executable instructions that, when executed by one or more processors of an apparatus, cause the apparatus to perform operations comprising:

obtaining a first image frame and a second image frame;

generating a modified first image frame and a modified second image frame, wherein to generate the modified first image frame and the modified second image frame comprises to convert a first color space of the first image frame and a second color space of the second image frame to a third color space;

extracting a first plurality of features from the modified first image frame;

extracting a second plurality of features from the modified second image frame;

determining a plurality of first matching costs for a plurality of feature pairs, wherein for each feature pair of the plurality of feature pairs:

the feature pair includes a respective first feature from the first plurality of features and a respective second feature from the second plurality of features, and the respective first matching cost of the plurality of first matching costs, determined for the feature pair quantifies a respective correspondence between the respective first feature and the respective second feature of the feature pair; and comparing the plurality of first matching costs to identify one or more feature pairs, from the plurality of feature pairs, as corresponding feature pairs between the modified first image frame and the modified second image frame.

19. The apparatus of claim 1, wherein the corresponding feature pairs comprise the one or more feature pairs with smaller respective first matching costs among the plurality of first matching costs.

20. The apparatus of claim 1, wherein the one or more processors are configured to cause the apparatus to perform at least one of optical flow estimation or structure from motion based on the corresponding feature pairs.

* * * * *